(12) United States Patent
Lee et al.

(10) Patent No.: US 8,149,769 B2
(45) Date of Patent: Apr. 3, 2012

(54) APPARATUS AND METHOD OF TRANSMITTING AND RECEIVING RECEPTION ACKNOWLEDGMENT SIGNAL IN MOBILE COMMUNICATION SYSTEM

(75) Inventors: Heesoo Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 12/517,968

(22) PCT Filed: Dec. 5, 2007

(86) PCT No.: PCT/KR2007/006285
§ 371 (c)(1),
(2), (4) Date: Jun. 5, 2009

(87) PCT Pub. No.: WO2008/069574
PCT Pub. Date: Jun. 12, 2008

(65) Prior Publication Data
US 2010/0315961 A1    Dec. 16, 2010

(30) Foreign Application Priority Data

Dec. 5, 2006  (KR) .................. 10-2006-0122602
Nov. 20, 2007  (KR) .................. 10-2007-0118517

(51) Int. Cl.
    *H04W 28/04* (2009.01)
(52) U.S. Cl. ........................ 370/328; 714/748
(58) Field of Classification Search .............. None
    See application file for complete search history.

(56) References Cited

U.S. PATENT DOCUMENTS

2003/0131299 A1* 7/2003 Ahn et al. ............... 714/748
(Continued)

FOREIGN PATENT DOCUMENTS

KR    1020030059982    7/2003
(Continued)

OTHER PUBLICATIONS

Korean Notice of Allowance for Application No. 10-2007-0118517, dated Mar. 10, 2010.

Herrmann, C. et al., "Improving Packet Loss Probability in the UMTS High-Speed Downlink," *IEEE 58th Vehicular Technology Conference*, vol. 4:2655-2659 (2003).

(Continued)

*Primary Examiner* — Min Jung
(74) *Attorney, Agent, or Firm* — Nelson Mullins Riley & Scarborough LLP; EuiHoon Lee, Esq.

(57) ABSTRACT

Provided are apparatus and method of transmitting and receiving a reception acknowledgment signal in a mobile communication system. The apparatus and method of receiving the reception acknowledgment signal includes respectively calculating a probability that the received reception acknowledgment signal is a reception success signal and a probability that the reception acknowledgment signal is a reception failure signal, by using an estimated packet error rate predicted based on a pre-set required packet error rate and determining whether the reception acknowledgment signal is the reception success signal or the reception failure signal. The apparatus and method of transmitting a reception acknowledgment signal includes determining transmission powers of a reception success signal and a reception failure signal in order to maximize a difference between a first complex signal and a second complex signal, the first complex signal being modulated for the reception success and the second complex signal being modulated for the reception failure, based on the average transmission power and a pre-set required packet error rate. The apparatus and method of transmitting reception acknowledgment signals transmits a single packet indicating reception successes or failures for a plurality of received data packets by using variable length coding based on a pre-set required packet error rate. According to the present invention, non-uniformity of frequency between the reception success signal and the reception failure signal is considered to increase correct reception rate of the reception acknowledgment signal.

23 Claims, 7 Drawing Sheets

U.S. PATENT DOCUMENTS

| | | | |
|---|---|---|---|
| 2003/0190926 A1* | 10/2003 | Harris et al. | 455/522 |
| 2006/0133290 A1* | 6/2006 | Lindoff et al. | 370/252 |
| 2006/0143163 A1* | 6/2006 | Smith et al. | 707/3 |
| 2007/0024559 A1* | 2/2007 | Ahn et al. | 345/89 |
| 2008/0080464 A1* | 4/2008 | Speight | 370/342 |

FOREIGN PATENT DOCUMENTS

| | | |
|---|---|---|
| KR | 1020060015232 | 2/2006 |
| WO | 2006/046586 A1 | 5/2006 |

OTHER PUBLICATIONS

IEEE C802.20-5/69, "QFDD and QTDD: Proposed Draft Air Interface Specifications, Default Physical Layer," pp. 9-44, 9-45, 9-76 (2005).

IEEE C802.20-05/68, "QFDD and QTDD: Technology Overview," pp. 63-65 (2005).

Quernheim, U. et al., "A New ARQ-Scheme for Multicast Satellite Communication," *3rd European Conference on Satellite Communications—ECSC-3*, pp. 11-15 (1993).

Korean Office Action for Application No. 10-2007-0118517, dated Jun. 19, 2009.

* cited by examiner

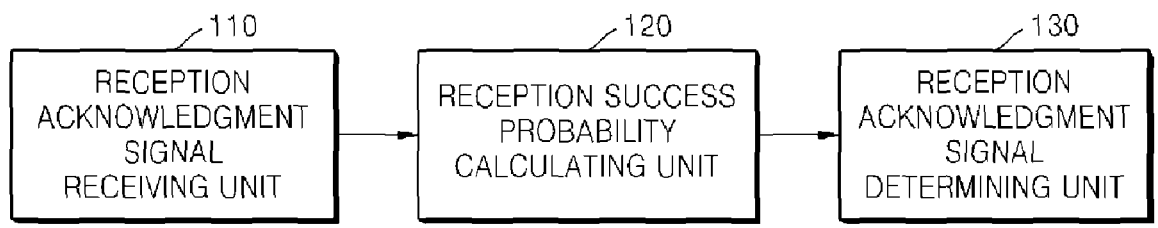
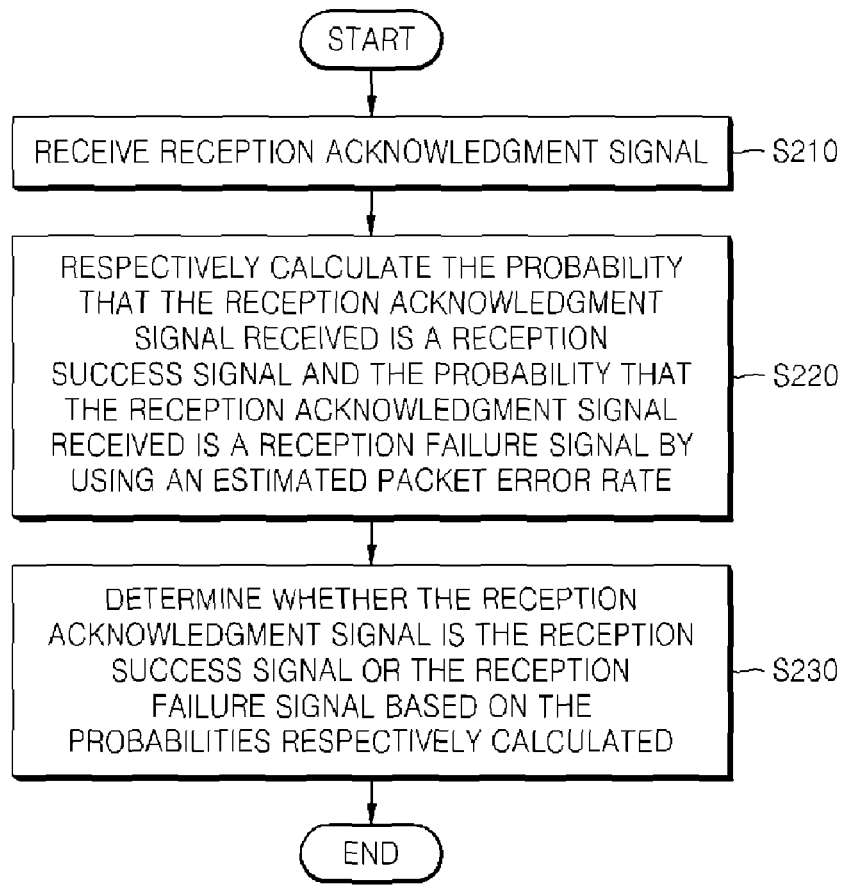

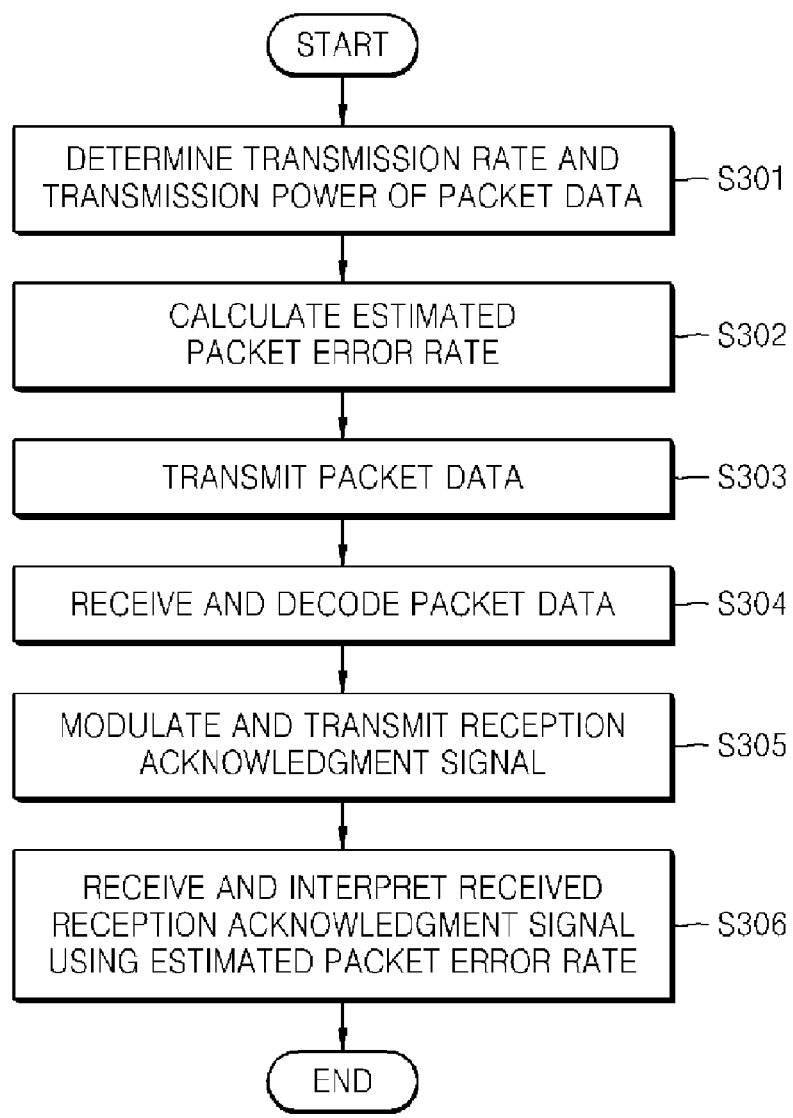
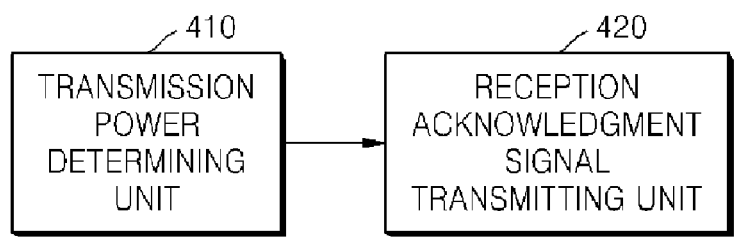

FIG. 10

| ALPHABET | PROBABILITY OF GENERATING (Prob) | HUFFMAN CODE | CODE LENGTH (L) | PROB*L |
|---|---|---|---|---|
| 000 | 0.970299 | 0 | 1 | 0.970299 |
| 001 | 0.009801 | 100 | 3 | 0.029403 |
| 010 | 0.009801 | 101 | 3 | 0.029403 |
| 100 | 0.009801 | 110 | 3 | 0.029403 |
| 011 | 0.000099 | 11100 | 5 | 0.000495 |
| 101 | 0.000099 | 11101 | 5 | 0.000495 |
| 110 | 0.000099 | 11110 | 5 | 0.000495 |
| 111 | 0.000001 | 11111 | 5 | 0.000005 |
| AVERAGE | | | | 1.059998 |

APPARATUS AND METHOD OF TRANSMITTING AND RECEIVING RECEPTION ACKNOWLEDGMENT SIGNAL IN MOBILE COMMUNICATION SYSTEM

RELATED APPLICATIONS

This application is a 35 U.S.C. §371 national stage filing of International Application No. PCT/KR2007/006285 filed on Dec. 5, 2007, which claims priority to, and the benefit of, Korean Patent Application Nos. 10-2006-0122602 filed on Dec. 5, 2006 and 10-2007-0118517 filed on Nov. 20, 2007. The contents of the aforementioned applications are hereby incorporated by reference.

TECHNICAL FIELD

The present invention relates to an apparatus and method of transmitting and receiving a reception acknowledgment (ACK) signal in a mobile communication system, and more particularly, to an apparatus and method of transmitting and receiving a reception acknowledgment signal having improved performance of receiving by using non-uniformity between an ACK signal and a negative ACK (NACK) signal.

This work was supported by the IT R&D program of MIC/IITA. [2006-S-001-01, Development of Adaptive Radio Access and Transmission Technologies for 4th Generation Mobile Communications]

BACKGROUND ART

A wireless channel in a mobile communication system has very low reliability due to effects such as fading. In some cases, data transmitted via such a wireless channel may not be decoded successfully at a receiving end. In this case, the receiving end should inform a transmitting end whether the decoding is successful so that transmitted data can be re-transmitted when necessary. A channel for informing whether the reception is successful is called an ACK/NACK channel. A reception success signal informing when the reception is successful at a receiving end is an ACK signal and a reception failure signal informing when reception has failed is called a NACK signal. As such, ACK/NACK information is generally 1 bit information.

In general, when the ACK/NACK signal is transmitted separately, the ACK/NACK signal is transmitted by performing Binary Phase Shift Keying (BPSK) modulation.

When it is assumed that transmission power is $P$, a signal of 1 is transmitted for the ACK signal, and a signal of −1 is transmitted for the NACK signal, a signal of $\sqrt{P}$ is transmitted for the ACK signal and a signal of $-\sqrt{P}$ is transmitted for the NACK signal from a transmitting end. In addition, when it is assumed that a signal sent from a transmitting end is $s$ and a wireless channel between a transmitter and a receiver is $h$, a reception signal of a receiving end $\tilde{y}$ is as given by Equation 1.

$$\tilde{y} = hs + \tilde{n} \qquad \text{[Equation 1]}$$

wherein $\tilde{n}$ is Additive White Gaussian Noise (AWGN).

When the real number part of the reception signal $\tilde{y}$ is a positive number, it is interpreted as an ACK signal and when the real number part of the reception signal $\tilde{y}$ is a negative number, it is interpreted as a NACK signal.

Unlike such a conventional method, only when decoding is successful at a receiving end, an ACK signal may be transmitted, and when decoding has failed, no signal may be transmitted.

DISCLOSURE OF INVENTION

Technical Problem

The ACK/NACK signal may be transmitted with a very low error rate. When the ACK/NACK signal is incorrectly transmitted, the efficiency of a system is considerably decreased. For example, when the ACK signal is transmitted and it is incorrectly recognized as the NACK signal, a packet is unnecessarily re-transmitted. Also, when the NACK signal is transmitted and it is incorrectly recognized as the ACK signal, a packet is not re-transmitted. Accordingly, a method of transmitting and receiving which can improve the receiving performance of the ACK/NACK channel is very important.

Technical Solution

In general, when a packet is transmitted from a mobile communication system, a data transmission rate differs according to the quality of a wireless channel. Here, adaptive modulation and coding is mainly used. In order to determine the data transmission rate to transmit data with a given quality of a wireless channel, a required packet error rate should be considered. A required transmission delay and required packet error rate are generally different according to types of data service. When the required packet error rate is determined, a packet scheduler considers a quality of a wireless channel and transmits data at the highest data transmission rate from among data transmission rates that provide a lower error rate than the required packet error rate.

Such a required packet error rate is generally much lower than 0.5. For example, 1/10, 1/100, and 1/1000. Accordingly, the frequency of transmitting an ACK signal is greater than that of an NACK signal.

The present invention provides an apparatus and method of transmitting and receiving which can increase the probability of correctly receiving an ACK/NACK signal in a wireless communication system by using a wide difference between the transmission frequency of the ACK signal and the transmission frequency of the NACK signal, that is, a non-uniformity between the ACK signal and the NACK signal.

DESCRIPTION OF DRAWINGS

The above and other features and advantages of the present invention will become more apparent by describing in detail exemplary embodiments thereof with reference to the attached drawings in which:

FIG. 1 is a block diagram of an apparatus for receiving a reception acknowledgment signal according to a first embodiment of the present invention;

FIG. 2 is a flowchart of a method of receiving a reception acknowledgment signal according to the first embodiment of the present invention;

FIG. 3 is a flowchart of transmitting and receiving a reception acknowledgment signal in a mobile communication system according to the first embodiment of the present invention;

FIG. 4 is a block diagram of an apparatus for transmitting a reception acknowledgment signal according to a second embodiment of the present invention;

FIG. 10 is a table illustrating variable length codes in which Huffman coding is applied according to the third embodiment of the present invention.

BEST MODE

Figure 5:
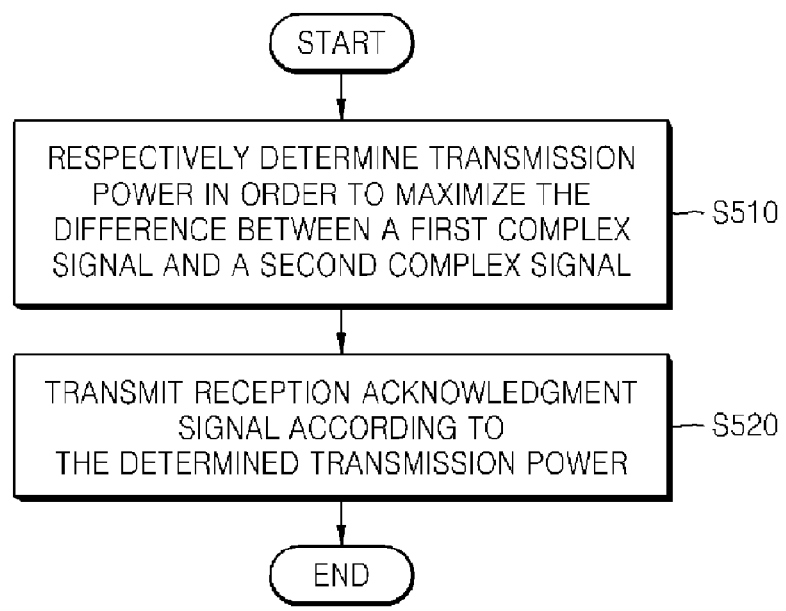
FIG. 5 is a flowchart of a method of transmitting a reception acknowledgment signal according to the second embodiment of the present invention.

According to an aspect of the present invention, there is provided a method of receiving a reception acknowledgment signal including: (a) receiving a reception acknowledgment signal indicating success or failure of receiving transmitted packet data correctly; (b) respectively calculating a probability that the reception acknowledgment signal is a reception success signal indicating the success of receiving the packet data correctly and a probability that the reception acknowledgment signal is a reception failure signal indicating the failure of receiving the packet data correctly, by using an estimated packet error rate predicted with respect to the success or failure of receiving the packet data correctly, based on a pre-set required packet error rate; and (c) determining whether the reception acknowledgment signal is the reception success signal or the reception failure signal based on the respectively calculated probabilities.

According to another aspect of the present invention, there is provided a method of transmitting a reception acknowledgment signal including: respectively determining transmission powers of a reception success signal indicating a success of receiving a packet data correctly and a reception failure signal indicating a failure of receiving a packet data correctly in order to maximize a difference between a first complex signal and a second complex signal, the first complex signal being modulated for the reception success and the second complex signal being modulated for the reception failure, based on an average transmission power and a pre-set required packet error rate; and transmitting the reception success signal and the reception failure signal according to the respectively determined transmission powers of the reception success signal and the reception failure signal.

According to another aspect of the present invention, there is provided an apparatus for receiving a reception acknowledgment signal including: a reception acknowledgment signal receiving unit receives a reception acknowledgment signal indicating success or failure of receiving transmitted packet data correctly; a transmission power estimating unit respectively estimates transmission powers of a reception success signal indicating a success of receiving the packet data correctly and a reception failure signal indicating a failure of receiving the packet data correctly in order to maximize a difference between a first complex and a second complex signal, the first complex signal being modulated for the reception success of the packet data and the second complex signal being modulated for the reception failure of the packet data, based on the average transmission power and the required packet error rate set to be the same with the apparatus for transmitting a reception acknowledgment signal; a reception success probability calculating unit respectively calculates the probability that the reception acknowledgment signal is the reception success signal and the probability that the reception acknowledgment signal is the reception failure signal, by using an estimated packet error rate predicted with respect to success or failure of receiving the packet data correctly, based on the transmission powers of the reception success signal and the reception failure signal respectively estimated, and the required packet error rate; and a reception acknowledgment signal determining unit determines whether the reception acknowledgment signal is the reception success signal or the reception failure signal based on the respectively calculated probabilities.

According to another aspect of the present invention, there is provided a method of receiving a reception acknowledgment signal including: (a) receiving a reception acknowledgment signal indicating success or failure of receiving transmitted packet data correctly; (b) respectively estimating transmission powers of a reception success signal indicating a success of receiving the packet data correctly and a reception failure signal indicating a failure of receiving the packet data correctly in order to maximize a difference between a first complex and a second complex signal, the first complex signal being modulated for the reception success of the packet data and the second complex signal being modulated for the reception failure of the packet data, based on the average transmission power and the required packet error rate set to be the same with the apparatus for transmitting a reception acknowledgment signal; (c) respectively calculating the probability that the reception acknowledgment signal is the reception success signal and the probability that the reception acknowledgment signal is the reception failure signal, by using an estimated packet error rate predicted with respect to success or failure of receiving the packet data correctly, based on the transmission powers of the reception success signal and the reception failure signal respectively estimated, and the required packet error rate; and (d) determining whether the reception acknowledgment signal is the reception success signal or the reception failure signal based on the respectively calculated probabilities.

According to another aspect of the present invention, there is provided a method of transmitting reception acknowledgment signals including: generating a single packet indicating reception successes or failures for a plurality of received data packets by using variable length coding based on a pre-set required packet error rate; and transmitting the generated single packet.

Mode for Invention

The following is the principle of the invention. Therefore, although not described or illustrated in the specification in detail, one of ordinary skill in the art can embody the principle of the invention and can invent various devices included in the concept and the scope of the invention. In addition, all conditional terms and embodiments illustrated in this specification are clearly intended to aid in understanding of the concept of the invention and are not limited to specified embodiments and states. Moreover, it will be understand that the detailed description of the invention including the principle, viewpoint, embodiments, and specified embodiments of the present invention are intended to include structural and functional equivalents thereof. Such equivalents intend to include currently disclosed equivalents, as well as equivalent to be developed in the future, that is, all devices invented to execute the same functions, regardless of the structure. Therefore, functions of various devices illustrated in the drawings including functional blocks which are indicated by a processor or a similar concept thereof can be provided by an embodiment entirely comprising hardware and hardware having a capability of executing appropriate software. When the functions are provided by the processor, the functions can be provided by a single process, a single common processor, or a plurality of separate processors and a part among these elements can be shared. Also, the terms illustrated as concepts of a processor, control, or similar concepts thereof cannot be interpreted by exclusively referring to hardware having a capability of executing software and are intended to include Digital Signal Processors (DSP), Read-Only-Memory (ROM) and Random-Access-Memory (RAM) for storing hardware and software, and non-volatile memory without restriction. Other well-known types of hardware can also be included.

The present invention will now be described more fully with reference to the accompanying drawings, in which exemplary embodiments of the invention are shown. In the description of the present invention, if it is determined that a detailed description of commonly-used technologies or structures related to the invention may unintentionally obscure the subject matter of the invention, the detailed description will be omitted.

FIG. 1 is a block diagram of an apparatus for receiving a reception acknowledgment signal according to a first embodiment of the present invention and FIG. 2 is a flowchart of a method of receiving a reception acknowledgment signal according to the first embodiment of the present invention.

Referring to FIG. 1, the apparatus for receiving a reception acknowledgment signal includes a reception acknowledgment signal receiving unit 110, a reception success probability calculating unit 120, and a reception acknowledgment signal determining unit 130.

The reception acknowledgment signal receiving unit 110 receives a reception acknowledgment signal ACK/NACK which indicates success or failure of receiving transmitted packet data correctly, in operation 210.

According to a pre-set required packet error rate, the reception success probability calculating unit 120 respectively calculates the probability that the reception acknowledgment signal received in the reception acknowledgment signal receiving unit 110 is an ACK signal indicating the success of receiving packet data correctly and the probability that the reception acknowledgment signal received in the reception acknowledgment signal receiving unit 110 is an NACK signal indicating the failure of receiving packet data correctly, by using an estimated packet error rate predicted with respect to the success or failure of receiving transmitted packet data correctly, in operation 220.

The reception success probability calculating unit 120 includes a prior probability calculating unit (not shown) and a posterior probability calculating unit (not shown).

The prior probability calculating unit respectively calculates a prior probability that the reception acknowledgment signal is transmitted as the reception success signal and a prior probability that the reception acknowledgment signal is transmitted as the reception failure signal from an apparatus for transmitting a reception acknowledgment signal, by using the estimated packet error rate predicted according to the pre-set required packet error rate.

More specifically, when the ACK/NACK signal is transmitted by performing Binary Phase Shift Keying (BPSK) modulation, transmission power is $$P,$$

a signal of 1 is transmitted for the ACK signal, and a signal of −1 is transmitted for the NACK signal, an $$S=\sqrt{P}$$

signal is transmitted for the ACK signal from a transmitting end, similar to the conventional art, and an $$S=-\sqrt{P}$$

signal is transmitted for the NACK signal from a transmitting end.

Here, when a wireless channel between a transmitter and a receiver is $$h,$$

a reception signal of a receiving end $$\tilde{y}$$

and a signal $$\hat{y}$$

extracted from the reception signal are as given by Equation 2.

$$\tilde{y} = hS + \tilde{n},$$

$$\hat{y} = \frac{h^*}{\|h\|}\tilde{y} = \|h\|S + \hat{n}$$

Here, $$\hat{n} = \frac{h^*}{\|h\|}\tilde{n}$$

and $$\tilde{n}$$

is Additive White Gaussian Noise (AWGN).

In the conventional method, when the real number part of the signal $$\hat{y}$$

extracted from the reception signal is a positive number, it is interpreted as the ACK signal and when the real number part of the signal $$\hat{y}$$

[Equation 2]

extracted from the reception signal is a negative number, it is interpreted as the NACK signal. In the conventional method, a non-uniformity of the ACK signal and the NACK signal is not considered. However, in the current embodiment of the present invention, a method of increasing the probability of correct reception of the ACK/NACK signal by using the non-uniformity of the ACK signal and the NACK signal is introduced.

When a transmitting signal is transmitted by performing BPSK modulation, an imaginary number part of the signal $$\hat{y}$$

extracted from the reception signal is not needed so that a model of the reception signal can be re-written as given by Equation 3.

$$y=\|h\|S+n \qquad \text{[Equation 3]}$$

wherein $$y=Re(\hat{y})$$

and $$n=Re(\hat{n}).$$

When it is assumed that $$n$$

is distributed according to a normal distribution of $$(n \sim N(0, \sigma^2/2)),$$

when a transmitting signal is given as $$S=s,$$

a probability distribution of $$y$$

becomes $$y \sim N(\|h\|s, \sigma^2/2).$$

When an estimated packet error rate with respect to the success of correct reception of transmitted packet data is $$\rho,$$

the probability that the transmitting signal $$S$$

is the ACK signal is $$\rho$$

and the probability that the transmitting signal $$S$$

is the NACK signal is $$1-\rho.$$

That is, a prior probability distribution of the transmitting signal $$S$$

is as given by Equation 4.

$$P(S=\sqrt{P})=\rho,$$

$$P(S=-\sqrt{P})=1-\rho. \qquad \text{[Equation 4]}$$

The posterior probability calculating unit (not shown) respectively calculates a posterior probability that the received reception acknowledgment signal is the reception success signal and a posterior probability that the received reception acknowledgment signal is the reception failure signal, by using a transmission power of the reception acknowledgment signal, the prior probability that the reception acknowledgment signal is transmitted as the reception success signal, the prior probability that the reception acknowledgment signal is transmitted as the reception failure signal, and the probability distribution of the signal $$y$$

extracted from the received reception acknowledgment signal.

More specifically, when the signal $$y$$

extracted from the reception signal is $$y',$$

a conditional probability that the transmitting signal $$S$$

is s is as given by Equation 5.

$$P(S=s/y=y') = \frac{P(S=s)P(y=y'/S=s)}{P(y=y')} \qquad \text{[Equation 5]}$$

Here, when a probability density function (PDF) of a probability distribution of the signal $$y$$

extracted from the reception signal is f, a posterior probability distribution of the transmitting signal $$S$$

which considers the signal $$y$$

extracted from the reception signal is as given by Equation 6.

$$P(S=s/y) = \frac{P(S=s)f(y/S=s)}{\sum_{g=\sqrt{P},-\sqrt{P}} P(S=g)f(y/S=g)} \qquad \text{[Equation 6]}$$

Here, g is only a parameter for a sigma operation and does not have a special physical meaning.

The reception acknowledgment signal determining unit 130 determines whether the reception acknowledgment signal is the ACK signal or the NACK signal based on the probabilities of the ACK signal and the NACK signal respectively calculated in the reception success probability calculating unit 120, in operation 230.

In other words, the reception acknowledgment signal determining unit 130 determines the reception acknowledgment signal as the ACK signal and the NACK signal, respectively, when the posterior probability $$P(S=\sqrt{P}/y)$$

that the received reception acknowledgment signal is the ACK signal is greater than the posterior probability $$P(S=-\sqrt{P}/y)$$

that the received reception acknowledgment signal is the NACK signal and when the posterior probability $$P(S=\sqrt{P}/y)$$

that the received reception acknowledgment signal is the ACK signal is smaller than the posterior probability $$P(S=-\sqrt{P}/y)$$

that the received reception acknowledgment signal is the NACK signal. This is illustrated in Equation 7.

$$\arg\max_{s=\sqrt{P},-\sqrt{P}} P(S=s/y) \qquad \text{[Equation 7]}$$

FIG. 3 is a flowchart of transmitting and receiving a reception acknowledgment signal in a mobile communication system according to the first embodiment of the present invention.

The apparatus for receiving a reception acknowledgment signal (apparatus for transmitting packet data) determines a transmission rate and transmission power of packet data according to a previously analyzed quality of a wireless channel and a previously set required packet error rate, in operation 301.

Parameters indicating a state of the wireless channel include a Signal-to-Noise Ratio (SNR) and a rank number using Multi Input Multi Output (MIMO) for examples.

In a frequency division duplexing (FDD) system, the apparatus for transmitting packet data transmits predetermined reference signals, and the apparatus for receiving packet data which receives the predetermined reference signals analyzes a channel quality and transmits the quality of the wireless channel obtained as a result of the analysis to the apparatus for transmitting packet data. Therefore, the quality of the wireless channel can be obtained at the apparatus for transmitting packet data. In addition, in a time division duplexing (TDD) system, the apparatus for transmitting packet data can determine the quality of the wireless channel. In general, the apparatus for transmitting packet data which performs adaptive transmission selects and transmits the optimum transmission method based on the quality of the wireless channel obtained by the apparatus for transmitting packet data.

That is, the quality of the wireless channel can be determined from information feedback from the apparatus for receiving packet data as in the FDD system or can be obtained by the apparatus for transmitting packet data itself as in the TDD system. The present invention can be applied to all cases regardless of specific types of duplexing methods.

In operation 302, the apparatus for receiving a reception acknowledgment signal (apparatus for transmitting packet data) calculates the estimated packet error rate in consideration of the transmission rate and transmission power of packet data and the quality of the wireless channel determined in operation 301.

The estimated packet error rate can be determined from a function of the transmission rate of transmitted data, a state of a wireless channel, and transmission power. In general, if the transmission power is great or the state of a wireless channel is excellent, the packet error rate may be lowered. In addition, the greater the transmission rate of transmitted data, the higher the packet error rate.

In operation 303, the apparatus for receiving a reception acknowledgment signal (apparatus for transmitting packet data) transmits packet data according to the transmission rate and transmission power of packet data determined in operation 301.

The apparatus for transmitting a reception acknowledgment signal (apparatus for receiving packet data) receives packet data transmitted in operation 303 and decodes the packet data in operation 304.

The apparatus for transmitting a reception acknowledgment signal (apparatus for receiving packet data) modulates the reception acknowledgment signal (ACK signal or NACK signal) according to the success or failure of decoding in operation 304 and transmits the modulated signal in operation 305.

In operation 306, the apparatus for receiving a reception acknowledgment signal (apparatus for transmitting packet data) receives and interprets the reception acknowledgment signal transmitted in operation 304 by using the estimated packet error rate calculated in operation 302. A process of interpreting a reception acknowledgment signal is described in detail with reference to FIGS. 1 and 2.

FIG. 4 is a block diagram of an apparatus for transmitting a reception acknowledgment signal according to a second embodiment of the present invention and FIG. 5 is a flowchart of a method of transmitting a reception acknowledgment signal performed in the apparatus for transmitting a reception acknowledgment signal of FIG. 4. In the conventional method, transmission power is set to be the same when transmitting the ACK signal and the NACK signal, whereas transmission power in the current embodiment is different when transmitting the ACK signal and the NACK signal by considering a transmission frequency of the ACK signal and the NACK signal. Thus, a success rate of receiving a reception acknowledgment signal correctly increases in the current embodiment.

Referring to FIG. 4, the apparatus for transmitting a reception acknowledgment signal includes a transmission power determining unit 410 and a reception acknowledgment signal transmitting unit 420.

The transmission power determining unit 410 respectively determines transmission powers of the ACK signal and the NACK signal in order to maximize the difference (distance) between a first complex signal and a second complex signal, the first complex signal being modulated for the ACK signal indicating the reception success and the second complex signal being modulated for the NACK signal indicating the reception failure, based on the average transmission power and the pre-set required packet error rate, in operation 510.

It is assumed that the transmission power when transmitting the ACK signal is $$P_{ACK}$$

and the transmission power when transmitting the NACK signal is $$P_{NACK}.$$

The transmitting signal when transmitting ACK information by a BPSK modulated signal is $$S=\sqrt{P_{ACK}}.$$

and the transmitting signal when transmitting NACK information by a BPSK modulated signal is $$S=-\sqrt{P_{NACK}}.$$

When the required packet error is δ, the average transmission power of the reception acknowledgment signal in which a frequency of generating ACK information and NACK information is considered is calculated as given by Equation 8.

$$\delta P_{ACK}+(1-\delta)P_{NACK} \qquad \text{[Equation 8]}$$

When information to be transmitted is ACK, $$S=\sqrt{P_{ACK}}$$

(first complex signal), a probability distribution of the signal $$y$$

extracted from the reception signal is $$y \sim N(\|h\|\sqrt{P_{ACK}}, \sigma^2/2),$$

and the probability density function (PDF) of the probability distribution is $$f(y/S=\sqrt{P_{ACK}}).$$

On the other hand, when the information to be transmitted is NACK, $$S=-\sqrt{P_{NACK}}$$

(second complex signal), a probability distribution of signal $$y$$

extracted from the reception signal is $$y \sim N(-\|h\|\sqrt{P_{NACK}}, \sigma^2/2),$$

and the probability density function (PDF) of the probability distribution is $$f(y/S=-\sqrt{P_{NACK}}).$$

In order to maximize a correct reception rate of the ACK/NACK signal, a distance $$(\|h\|\sqrt{P_{ACK}}-(-\|h\|\sqrt{P_{NACK}}))$$

between $$\|h\|\sqrt{P_{ACK}}$$

and $$-\|h\|\sqrt{P_{NACK}}$$

should be maximized. Ultimately, the optimum transmission powers $$P_{ACK}$$

and $$P_{NACK}$$

which maximize a correct reception rate of the ACK/NACK signal in the given average transmission power $$P$$

are solutions of an optimization problem as given by Equation 9 which finds solutions to make the difference between the first complex signal and the second complex signal be at a maximum.

$$\max \sqrt{P_{ACK}}+\sqrt{P_{NACK}} \qquad \text{Equation 9}$$

$$s.t. \; \delta P_{ACK}+(1-\delta)P_{NACK}=P$$

$$P_{ACK}, P_{NACK} \geq 0$$

It is assumed that the solutions of the optimization problem above are $$\overline{P}_{ACK}(\delta)$$

and $$\overline{P}_{NACK}(\delta).$$

If a value of $$\delta$$

is 0.9, the transmission powers of the ACK signal and the NACK signal are respectively $$\overline{P}_{ACK}(0.9)=0.11P$$

and $$\overline{P}_{NACK}(0.9)=9.01P.$$

If a value of $$\delta$$

is 0.99, the transmission powers of the ACK signal and the NACK signal are respectively $$\overline{P}_{ACK}(0.99)=0.01P$$

and $$\overline{P}_{NACK}(0.99)=99.01P.$$

In operation 520, the reception acknowledgment signal transmitting unit 420 transmits the ACK signal and the NACK signal according to the transmission power of the ACK signal $$\overline{P}_{ACK}(\delta)$$

and the transmission power of the NACK signal $$\overline{P}_{NACK}(\delta)$$

respectively determined in the transmission power determining unit 410.

In the apparatus for transmitting a reception acknowledgment signal according to the current embodiment of the present invention, sharing the required packet error rate with the apparatus for receiving a reception acknowledgment signal is required. That is, the required packet error rate should be set to be the same for the receiving side of a reception acknowledgment signal.

The required packet error rate that is previously agreed to share the required packet error rate is stored in a database by each traffic type of packet data or a signal is exchanged so as to set the required packet error rate immediately after connecting with the apparatus for receiving a reception acknowledgment signal while commencing a service for transmitting and receiving packet data, so that the required packet error rate can be set to be the same with the receiving side of a reception acknowledgment signal.

Figure 6:
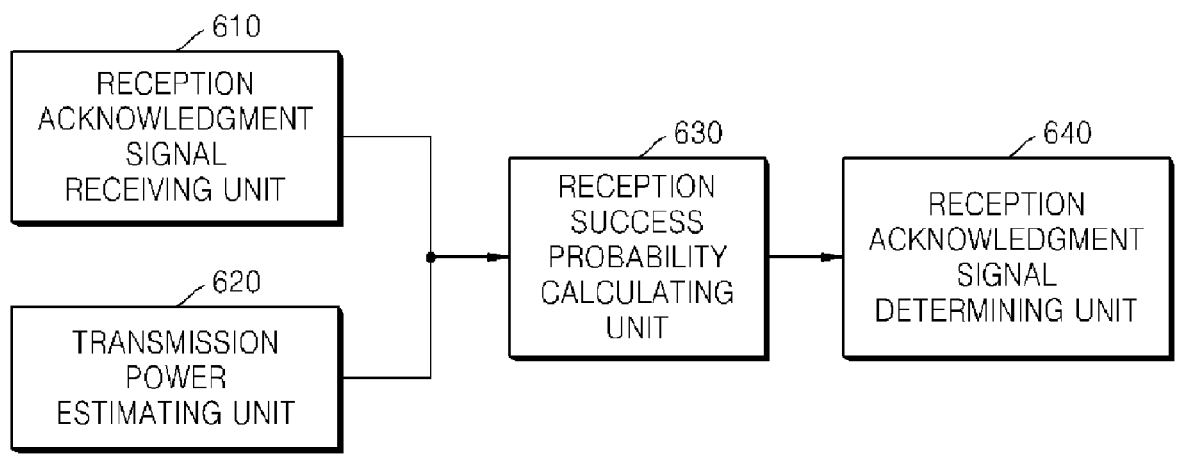
FIG. 6 is a block diagram of an apparatus for receiving a reception acknowledgment signal which corresponds to the apparatus for transmitting a reception acknowledgment signal according to the second embodiment of the present invention.
Figure 7:
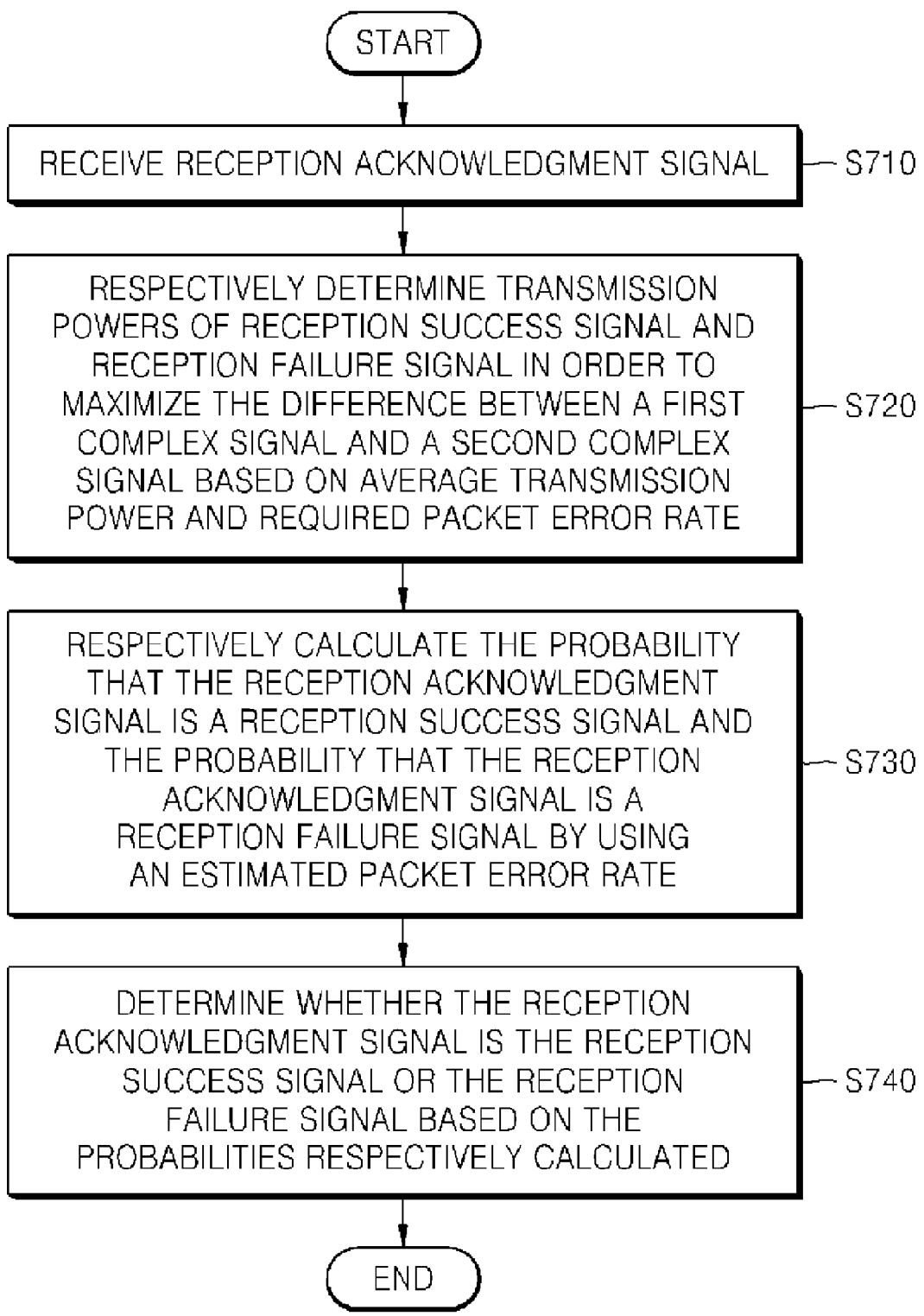
FIG. 7 is a flowchart of an method for receiving a reception acknowledgment signal which corresponds to the method for transmitting a reception acknowledgment signal according to the second embodiment of the present invention.

FIG. 6 is a block diagram of an apparatus for receiving a reception acknowledgment signal which corresponds to the apparatus for transmitting a reception acknowledgment signal according to the second embodiment of the present invention and FIG. 7 is a flowchart of a method of receiving a reception acknowledgment signal performed in the apparatus for receiving a reception acknowledgment signal of FIG. 4.

Referring to FIG. 6, the apparatus for receiving a reception acknowledgment signal includes a reception acknowledgment signal receiving unit 610, a transmission power estimating unit 620, a reception success probability calculating unit 630, and a reception acknowledgment signal determining unit 640.

The reception acknowledgment signal receiving unit 610 receives a reception acknowledgment signal indicating success or failure of receiving transmitted packet data correctly, in operation 710.

In operation 720, the transmission power estimating unit 620 respectively estimates transmission powers of a reception success signal and a reception failure signal in order to maximize the difference (distance) between a first complex and a second complex signal, the first complex signal being modulated for the reception success signal of the packet data and the second complex signal being modulated for the reception failure signal of the packet data, based on the average transmission power and the required packet error rate set to be the same with the apparatus for transmitting a reception acknowledgment signal.

In the apparatus for receiving a reception acknowledgment signal according to the current embodiment of the present invention, sharing the required packet error rate with the apparatus for transmitting a reception acknowledgment signal is required. That is, the required packet error rate should be set to be the same with the transmitting side of a reception acknowledgment signal.

The method of respectively estimating the transmission powers of the reception success signal and the reception failure signal in the transmission power estimating unit 620 is same with the method of respectively determining the transmission powers of the reception success signal and the reception failure signal in the transmission power determining unit 410 of the apparatus for transmitting a reception acknowledgment signal illustrated in FIG. 4.

In operation 730, the reception success probability calculating unit 630 respectively calculates the probability that the received reception acknowledgment signal is the reception success signal and the probability that the received reception acknowledgment signal is the reception failure signal, by using the estimated packet error rate predicted with respect to success or failure of receiving the packet data correctly, according to the transmission powers of the reception success signal and the reception failure signal respectively estimated from the transmission power estimating unit 620, and the required packet error rate.

In other words, the reception success probability calculating unit 630 respectively calculates a posterior probability that the received reception acknowledgment signal is the reception success signal and a posterior probability that the received reception acknowledgment signal is the reception failure signal, by using the transmission powers of the reception success signal and the reception failure signal respectively estimated by the transmission power estimating unit 620, and a probability distribution of the signal extracted from the received reception acknowledgment signal.

More specifically, the apparatus for receiving a reception acknowledgment signal according to the current embodiment of the present invention respectively calculates the posterior probability that the received reception acknowledgment signal is the reception success signal and the posterior probability that the received reception acknowledgment signal is the reception failure signal, by using a posterior probability distribution of $S$ as in the apparatus for receiving a reception acknowledgment signal illustrated in FIG. 1. This is illustrated in Equation 10.

$$P(S=s/y) = \frac{P(S=s)f(y/S=s)}{\sum_{g=\sqrt{P_{ACK}},-\sqrt{P_{NACK}}} P(S=g)f(y/S=g)}$$ [Equation 10]

In operation 740, the reception acknowledgment signal determining unit 640 determines whether the received reception acknowledgment signal is the reception success signal or the reception failure signal based on the probabilities respectively calculated by the reception success probability calculating unit 630. In other words, the reception acknowledgment signal determining unit 640 can identify whether the received reception acknowledgment signal is the ACK signal or the NACK signal by using the method of the maximum likelihood as given by Equation 11.

$$\arg\max_{j=\sqrt{P_{ACK}},-\sqrt{P_{NACK}}} P(S=s/y)$$ [Equation 11]

Figure 8:
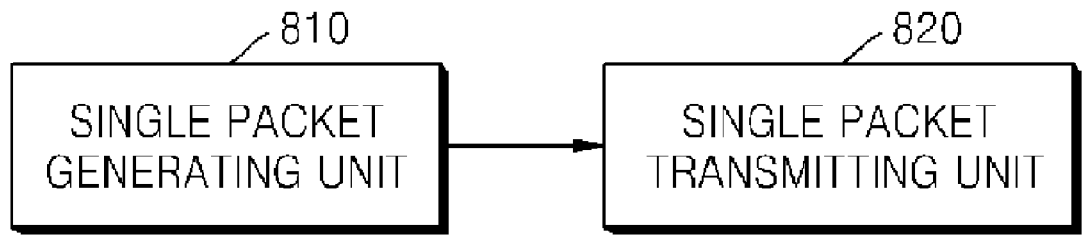
FIG. 8 is a block diagram of an apparatus for transmitting a reception acknowledgment signal according to a third embodiment of the present invention.
Figure 9:
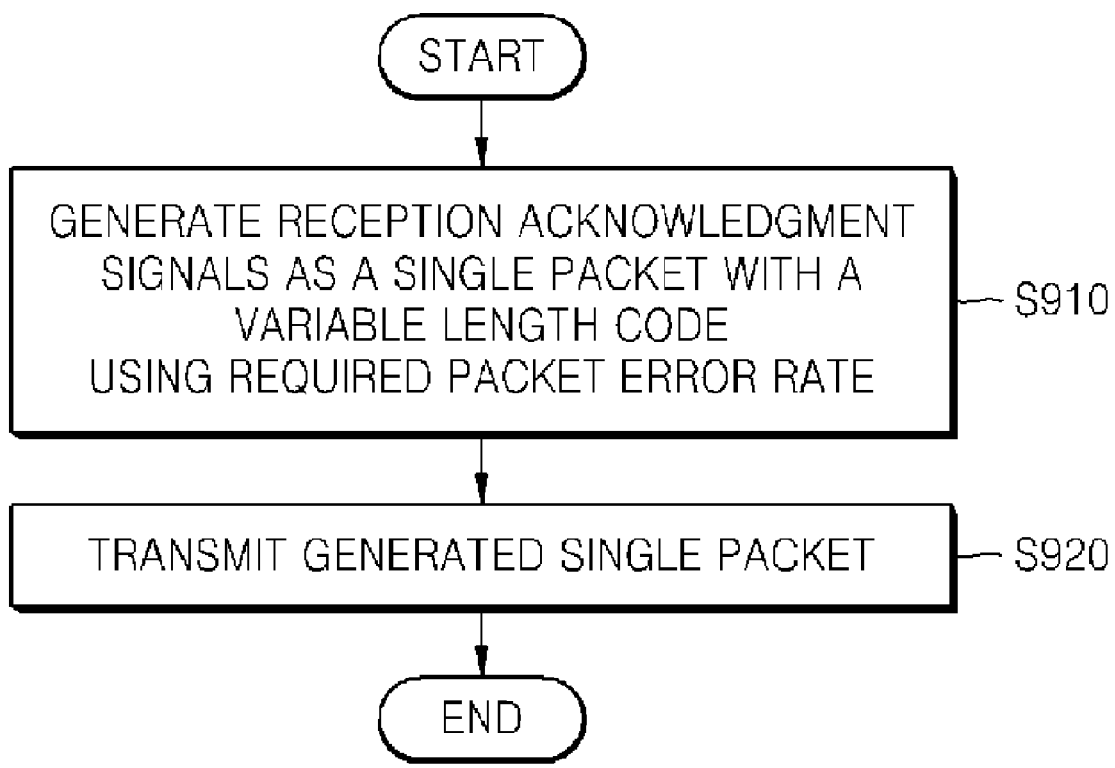
FIG. 9 is a flowchart of a method of transmitting a reception acknowledgment signal according to the third embodiment of the present invention.

FIG. 8 is a block diagram of an apparatus for transmitting a reception acknowledgment signal according to a third embodiment of the present invention and FIG. 9 is a flowchart of a method of transmitting a reception acknowledgment signal performed in the apparatus for transmitting a reception acknowledgment signal of FIG. 8.

In the first and second embodiments illustrated with reference to FIGS. 1 through 7, the apparatus and method of transmitting and receiving a reception acknowledgment signal, in which the asymmetry in the frequency of generating the ACK/NACK signal is considered when one piece of ACK or NACK information is transmitted, are illustrated. In the current embodiment of the present invention, an apparatus and method of transmitting a reception acknowledgment signal, in which the asymmetry in the frequency of generating the ACK/NACK signal is considered when a plurality of ACK or NACK information is transmitted within one packet, are illustrated.

Referring to FIG. 8, the apparatus for transmitting a reception acknowledgment signal according to the current embodiment of the present invention includes a single packet generating unit 810 and a single packet transmitting unit 820.

The single packet generating unit 810 generates a single packet indicating reception successes or failures for a plurality of received data packets by using variable length coding based on a pre-set required packet error rate, in operation 910.

According to the conventional art, when the apparatus for transmitting a reception acknowledgment signal (apparatus for receiving data packet) receives $N$ data packets and generates $N$ pieces of ACK/NACK information, information of $N$ bits is transmitted.

Variable length coding is a coding method which reduces the average number of coded bits by allocating a short code to information having a high frequency and a long code to information having a low frequency. Huffman code is a typical example of variable length coding.

In the current embodiment of the present invention, Huffman coding is used as a variable length coding method, in order to reduce the average number of coded bits used to transmit ACK/NACK information, compared with the conventional art in which the non-uniformity of ACK/NACK information is not considered and the same size of codes are allocated to all information. As such, in order to represent $N$ pieces of ACK/NACK information, $2^N$ alphabets are needed. The number of alphabets that have $n$ pieces of ACK signals and $N-n$ pieces of NACK signals is given by Equation 12.

$$C_n^N = \frac{N!}{n!(N-n)!} \quad \text{[Equation 12]}$$

When all $N$ pieces of ACK/NACK information have the same probability of $\delta$ with which ACK/NACK information is ACK, the probability with which each alphabet that have $n$ pieces of ACK signals and $N-n$ pieces of NACK signals occurs is given by Equation 13.

$$\delta^n(1-\delta)^{N-n} \quad \text{[Equation 13]}$$

As such, the probability of each of the $2^N$ alphabets is obtained and a Hoffman code is allocated to each of the alphabets based on the probability of each alphabets.

For example, when 3 pieces of ACK/NACK information exists and the probability with which each ACK/NACK information is ACK equals 0.01, the Huffman code given to each alphabets is as illustrated in FIG. 10.

Referring to FIG. 10, the average number of bits sent when transmitting by using a Huffman code is 1.059998 and is smaller that that of the conventional art which is 3 bits. When the probability of generating ACK is increased to 0.1, the average number of bits transmitted is slightly increased to 1.598. However, it is still reduced to half of the number of bits transmitted on the average, compared with that of the conventional art.

The single packet transmitting unit 820 transmits the single packet generated from the single packet generating unit 810 by using Huffman coding as described above in operation 920.

Figure 11:
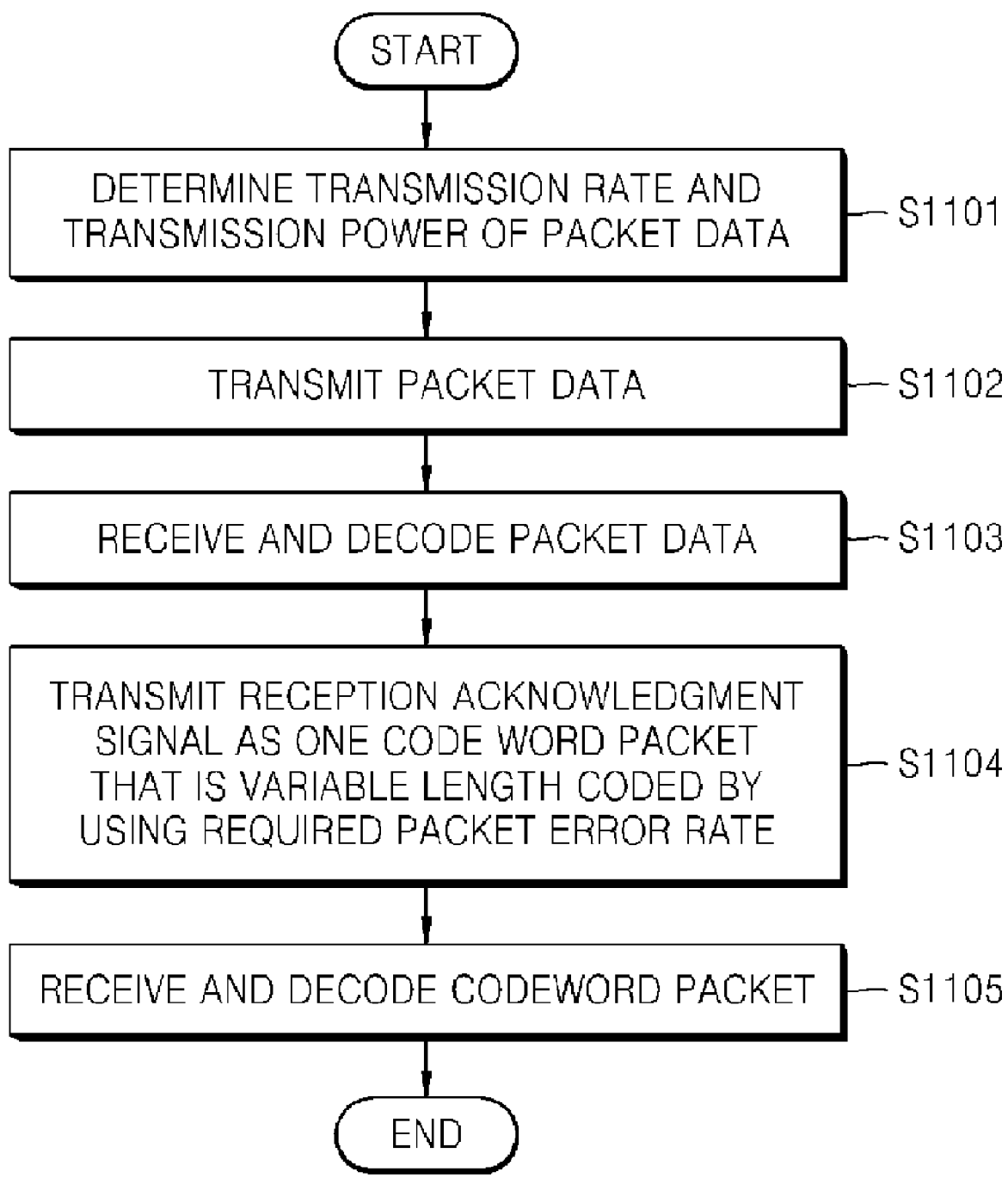
FIG. 11 is a flowchart of a method of transmitting and receiving in a mobile communication system in which a number of apparatuses for a receiving reception acknowledgment signal and one apparatus for transmitting a reception acknowledgment signal exist according to the third embodiment of the present invention.

FIG. 11 is a flowchart of a method of transmitting and receiving in a mobile communication system in which a number of apparatuses for receiving a reception acknowledgment signal (apparatus for transmitting packet data) and one apparatus for transmitting a reception acknowledgment signal (apparatus for receiving packet data) exist according to the third embodiment of the present invention.

A number of the apparatuses for receiving a reception acknowledgment signal (apparatus for transmitting packet data) determine the transmission rate and the transmission power of packet data so as to satisfy the required packet error rate $\delta$ according to a state of the wireless channel in operation 1101.

In operation 1102, a number of apparatuses for receiving a reception acknowledgment signal (apparatus for transmitting packet data) transmit packet data using the transmission rate and the transmission power of packet data determined in operation 1101

The one apparatus for transmitting a reception acknowledgment signal (apparatus for receiving packet data) receives packet data transmitted from a number of apparatuses for receiving a reception acknowledgment signal in operation 1002 and decodes the packet data in operation 1103.

The apparatus for transmitting a reception acknowledgment signal (apparatus for receiving packet data) groups a number of reception acknowledgment signals (ACK/NACK) into one codeword packet by using variable length coding based on the required packet error rate $\delta$ according to the successes or failures of decoding packet data in operation 1103 and modulates the codeword packet so as to transmit the codeword packet to the number of apparatuses for receiving a reception acknowledgment signal (apparatus for transmitting packet data) in operation 1004.

The method of variable length coding in operation 1104 is illustrated in detail with reference to FIGS. 8 through 10.

A number of apparatuses for receiving a reception acknowledgment signal (apparatus for transmitting packet data) receives one codeword packet including a number of reception acknowledgment signals and decodes the codeword packet, thereby identifying reception success of the data packet transmitted by itself in operation 1105.

According to the present invention, the probability of correctly interpreting the ACK/NACK signal can be significantly increased and the success rate of receiving ACK/NACK information correctly in a wireless communication system can also be increased.

According to the apparatus and method of receiving a reception acknowledgment signal in the first embodiment of the present invention, the received reception acknowledgment signal is interpreted by using the non-uniformity of the frequency of generating the ACK/NACK signal, that is, advanced information, so that the performance of the apparatus and method can be increased.

According to the apparatus and method for transmitting and receiving a reception acknowledgment signal in the second embodiment of the present invention, the transmission power of the ACK signal and the NACK signal differ by using the non-uniformity of the frequency of generating the ACK/NACK signal in the apparatus for transmitting a reception acknowledgment signal so that the probability of correctly interpreting the ACK/NACK signal can be increased in the apparatus for receiving a reception acknowledgment signal.

According to the apparatus and method for transmitting a reception acknowledgment signal in the third embodiment of the present invention, a number of reception acknowledgment signals are transmitted as a single packet by using variable length coding based on the non-uniformity of the frequency of generating the ACK/NACK signal so that the reception acknowledgment signal can be transmitted with a small average number of bits.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, hard disks, floppy disks, flash memory, optical data storage devices, and carrier waves (such as data transmission through the Internet). The computer readable recording medium can also be distributed over network coupled computer systems so that the computer readable code is stored and executed in a distributed fashion. In addition, a font ROM data structure according to the present invention be embodied as computer readable codes on a computer readable recording medium such as ROM, RAM, CD-ROM, magnetic tapes, hard disks, floppy disks, flash memory, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of receiving a reception acknowledgment signal comprising:
   (a) receiving a reception acknowledgment signal indicating success or failure of receiving transmitted packet data correctly;
   (b) respectively calculating a probability that the reception acknowledgment signal is a reception success signal indicating the success of receiving the packet data correctly and a probability that the reception acknowledgment signal is a reception failure signal indicating the failure of receiving the packet data correctly, by using an estimated packet error rate determined based on a pre-set required packet error rate; and
   (c) determining whether the reception acknowledgment signal is the reception success signal or the reception failure signal based on the respectively calculated probabilities.

2. The method of claim 1, wherein (b) comprises:
   (b-1) respectively calculating a first probability that the reception acknowledgment signal is transmitted as the reception success signal from an apparatus for transmitting the reception acknowledgment signal and a second probability that the reception acknowledgment signal is transmitted as the reception failure signal, by using the estimated packet error rate; and
   (b-2) respectively calculating a third probability that the received reception acknowledgment signal is the reception success signal and a fourth probability that the received reception acknowledgment signal is the reception failure signal, by using a transmission power of the reception acknowledgment signal, the first probability that the reception acknowledgment signal is transmitted as the reception success signal, the second probability that the reception acknowledgment signal is transmitted as the reception failure signal, and a probability distribution of a signal extracted from the received reception acknowledgment signal.

3. The method of claim 1, wherein (c) comprises:
   (c-1) determining the received reception acknowledgment signal as the reception success signal when the third probability of the reception success signal is greater than the fourth probability of the reception failure signal; and
   (c-2) determining the received reception acknowledgment signal as the reception failure signal when the third probability of the reception success signal is smaller than the fourth probability of the reception failure signal.

4. The method of claim 1, wherein the estimated packet error rate is estimated by considering the required packet error rate, a pre-analyzed quality of a wireless channel, a transmission rate and a transmission power of the packet data.

5. A method of transmitting a reception acknowledgment signal comprising:
   respectively determining transmission powers of a reception success signal indicating a success of receiving a packet data correctly and a reception failure signal indicating a failure of receiving a packet data correctly in order to maximize a difference between a first signal and a second signal, the first signal being modulated for the reception success and the second signal being modulated for the reception failure, based on an average transmission power and a pre-set required packet error rate; and
   transmitting the reception success signal and the reception failure signal according to the respectively determined transmission powers of the reception success signal and the reception failure signal.

6. The method of claim 5, wherein the required packet error rate is set to be the same as a packet error rate with an apparatus for receiving a reception acknowledgment signal.

7. The method of claim 5, wherein the required packet error rate is set according to traffic types of the packet data and is stored in database.

8. The method of claim 5, wherein the required packet error rate is set to be the same as a packet error rate with an apparatus for receiving a reception acknowledgment signal, according to a signal exchanged after connecting with the apparatus for receiving a reception acknowledgment signal.

9. An apparatus for receiving a reception acknowledgment signal comprising:
   a reception acknowledgment signal receiving unit receiving a reception acknowledgment signal indicating success or failure of receiving transmitted packet data correctly;
   a transmission power estimating unit respectively determining transmission powers of a reception success signal indicating a success of receiving the packet data correctly and a reception failure signal indicating a failure of receiving the packet data correctly based on an average transmission power and a required packet error rate, which is set to be the same as a packet error rate with the apparatus for transmitting a reception acknowledgment signal, in order to maximize a difference between a first signal and a second signal, the first signal being modulated for the reception success of the packet data and the second signal being modulated for the reception failure of the packet data;
   a reception success probability calculating unit respectively calculating the probability that the reception acknowledgment signal is the reception success signal and the probability that the reception acknowledgment signal is the reception failure signal, by using an estimated packet error rate predicted with respect to success or failure of receiving the packet data correctly, based on the transmission powers of the reception success signal and the reception failure signal respectively estimated, and the required packet error rate; and
   a reception acknowledgment signal determining unit determining whether the reception acknowledgment signal is the reception success signal or the reception failure signal based on the respectively calculated probabilities.

10. The apparatus for claim 9, wherein the reception success probability calculating unit respectively calculates a first probability that the received reception acknowledgment signal is the reception success signal and a second probability that the received reception acknowledgment signal is the reception failure signal, by using transmission powers of the reception success signal and the reception failure signal, the third probability that the reception acknowledgment signal is transmitted as the reception success signal, the fourth probability that the reception acknowledgment signal is transmitted as the reception failure signal, and a probability distribution of a signal extracted from the received reception acknowledgment signal.

11. The apparatus for claim 9, wherein reception acknowledgment signal determining unit determines the received reception acknowledgment signal as the reception success signal when the first probability of the reception success signal is greater than the second probability of the reception failure signal and determines the received reception acknowledgment signal as the reception failure signal when the first probability of the reception success signal is smaller than the second probability of the reception failure signal.

12. The apparatus for claim 9, wherein the required packet error rate is set according to each traffic type of the packet data and is stored in database.

13. The apparatus for claim 9, wherein the required packet error rate is set to be the same as a packet error rate with the an apparatus for transmitting a reception acknowledgment signal, according to a signal exchanged after connecting with the apparatus for transmitting a reception acknowledgment signal.

14. A method of receiving a reception acknowledgment signal comprising:
  (a) receiving a reception acknowledgment signal indicating success or failure of receiving transmitted packet data correctly;
  (b) respectively determining transmission powers of a reception success signal indicating a success of receiving the packet data correctly and a reception failure signal indicating a failure of receiving the packet data correctly based on an average transmission power and a required packet error rate, which is set to be the same as a packet error rate with the apparatus for transmitting a reception acknowledgment signal, in order to maximize a difference between a first signal and a second signal, the first signal being modulated for the reception success of the packet data and the second signal being modulated for the reception failure of the packet data;
  (c) respectively calculating the probability that the reception acknowledgment signal is the reception success signal and the probability that the reception acknowledgment signal is the reception failure signal, by using an estimated packet error rate predicted with respect to success or failure of receiving the packet data correctly, based on the transmission powers of the reception success signal and the reception failure signal respectively estimated, and the required packet error rate; and
  (d) determining whether the reception acknowledgment signal is the reception success signal or the reception failure signal based on the respectively calculated probabilities.

15. The method of claim 14, wherein (c) comprises respectively calculating a first probability that the received reception acknowledgment signal is the reception success signal and a second probability that the received reception acknowledgment signal is the reception failure signal, by using transmission powers of the reception success signal and the reception failure signal, the third probability that the reception acknowledgment signal is transmitted as the reception success signal, the fourth probability that the reception acknowledgment signal is transmitted as the reception failure signal, and a probability distribution of a signal extracted from the received reception acknowledgment signal.

16. The method of claim 14, wherein (d) comprises:
  (d-1) determining the received reception acknowledgment signal as the reception success signal when the first probability of the reception success signal is greater than the second probability of the reception failure signal; and
  (d-2) determining the received reception acknowledgment signal as the reception failure signal when the first probability of the reception success signal is smaller than the second probability of the reception failure signal.

17. The method of claim 14, wherein the required packet error rate is set according to each traffic type of the packet data and is stored in database.

18. The method of claim 14, wherein the required packet error rate is set to be the same as a packet error rate with the an apparatus for transmitting a reception acknowledgment signal, according to a signal exchanged after connecting with the apparatus for transmitting a reception acknowledgment signal.

19. A method of transmitting reception acknowledgment signals comprising:
  generating a single packet indicating reception successes or failures for a plurality of received data packets by using variable length coding, wherein the variable length coding allocates a different length to the single packet according to a frequency of generating the single packet, wherein the frequency is determined based on a pre-set required packet error rate; and
  transmitting the generated single packet.

20. The method of claim 19, wherein the variable length code is a Huffman code.

21. The method of claim 19, wherein the required packet error rate is set to be the same as a packet error rate with an apparatus for receiving a reception acknowledgment signal.

22. The method of claim 19, wherein the required packet error rate is set according to each traffic type of the packet data and is stored in database.

23. The method of claim 19, wherein the required packet error rate is set to be the same as a packet error rate with an apparatus for receiving a reception acknowledgment signal, according to a signal exchanged after connecting with the apparatus for receiving a reception acknowledgment signal.

* * * * *